US008413688B2

(12) United States Patent
Bassoli

(10) Patent No.: US 8,413,688 B2
(45) Date of Patent: Apr. 9, 2013

(54) DEVICE FOR CONTROLLING A PILOT PRESSURE SIGNAL

(75) Inventor: Ivan Bassoli, Reggio Emilia (IT)

(73) Assignee: Walvoil S.p.A., Reggio Emilia (IT)

( * ) Notice: Subject to any disclaimer, the term of this patent is extended or adjusted under 35 U.S.C. 154(b) by 203 days.

(21) Appl. No.: 12/956,059

(22) Filed: Nov. 30, 2010

(65) Prior Publication Data

US 2011/0132472 A1 Jun. 9, 2011

(30) Foreign Application Priority Data

Nov. 30, 2009 (IT) .............................. PR2009A0100

(51) Int. Cl.
*G05D 7/01* (2006.01)

(52) U.S. Cl. ................ 138/46; 91/420; 91/443; 91/447; 137/601.18; 137/601.2

(58) Field of Classification Search .................... 138/46; 91/420, 443, 447; 137/601.18, 601.2
See application file for complete search history.

(56) References Cited

U.S. PATENT DOCUMENTS

| | | | | | |
|---|---|---|---|---|---|
| 2,311,381 | A | * | 2/1943 | Green | 138/46 |
| 2,367,106 | A | * | 1/1945 | Dolch | 137/540 |
| 2,402,729 | A | * | 6/1946 | Buchanan | 138/43 |
| 2,634,947 | A | * | 4/1953 | Gardner | 137/513.3 |
| 3,067,769 | A | * | 12/1962 | Skulley | 137/483 |
| 3,332,436 | A | * | 7/1967 | Welty | 137/468 |
| 3,741,241 | A | * | 6/1973 | Jackson | 137/504 |
| 4,044,991 | A | * | 8/1977 | Waller | 251/122 |
| 4,106,525 | A | * | 8/1978 | Currie et al. | 138/43 |
| 4,200,119 | A | * | 4/1980 | Cunningham | 137/605 |
| 4,704,947 | A | * | 11/1987 | Schneider | 91/518 |
| 4,854,221 | A | | 8/1989 | Tardy | |
| 4,953,639 | A | * | 9/1990 | Hamner et al. | 175/203 |
| 5,148,830 | A | * | 9/1992 | Liu | 137/513.7 |
| 5,259,293 | A | | 11/1993 | Brunner | |
| 5,263,400 | A | * | 11/1993 | Huesser | 91/420 |
| 5,584,226 | A | * | 12/1996 | Roemer et al. | 91/447 |
| 5,868,161 | A | * | 2/1999 | Asbrand et al. | 137/498 |

(Continued)

FOREIGN PATENT DOCUMENTS

| | | | |
|---|---|---|---|
| DE | 200 05 682 | U1 | 6/2000 |
| DE | 103 35 120 | A1 | 2/2005 |
| EP | 1 178 219 | A1 | 2/2002 |
| EP | 1 528 264 | A1 | 5/2005 |

OTHER PUBLICATIONS

Italian Search Report, dated Jun. 25, 2010, from corresponding Italian application.

*Primary Examiner* — John Rivell
*Assistant Examiner* — Minh Le
(74) *Attorney, Agent, or Firm* — Young & Thompson

(57) ABSTRACT

A device (100, 200, 200*bis*, 300, 300*bis*) for controlling a pilot pressure signal of hydraulic valves (3), for controlling the handling of gravitational loads (M), operating between two pilot lines (108, 109, 208, 209, 308, 309) between the valve (3) and a cylinder (1) adapted to sustain the load (M). The device (100, 200, 200*bis*, 300, 300*bis*) is a two-way and two-position valve for the communication between the cylinder stem-side pilot line (5) and the valve-side line (3) and is a valve which can take an open position and a partialized position, or anyway it never takes a closed position. The device (100, 200, 200*bis*, 300, 300*bis*) can take a position so that the fluid passage between the pilot lines (108, 109, 208, 209, 308, 309) is never completely closed.

5 Claims, 10 Drawing Sheets

U.S. PATENT DOCUMENTS

| | | | | |
|---|---|---|---|---|
| 5,996,466 | A * | 12/1999 | Heusser | 91/420 |
| 6,003,427 | A * | 12/1999 | Asbrand et al. | 91/447 |
| 6,401,758 | B1 * | 6/2002 | Ziv-Av | 138/43 |
| 6,546,839 | B1 * | 4/2003 | Jamra et al. | 91/443 |
| 7,114,518 | B2 * | 10/2006 | Kirby | 137/504 |
| 7,207,712 | B2 * | 4/2007 | Kozyuk | 366/341 |
| 7,566,044 | B1 * | 7/2009 | Bowser et al. | 251/117 |
| 2002/0157711 | A1 * | 10/2002 | Engler | 137/519.5 |
| 2006/0081295 | A1 * | 4/2006 | Kirby | 137/601.18 |
| 2006/0090803 | A1 * | 5/2006 | Paluncic et al. | 138/43 |
| 2008/0135109 | A1 * | 6/2008 | Bonne et al. | 137/493 |
| 2010/0310386 | A1 * | 12/2010 | Jemuller | 417/212 |

* cited by examiner

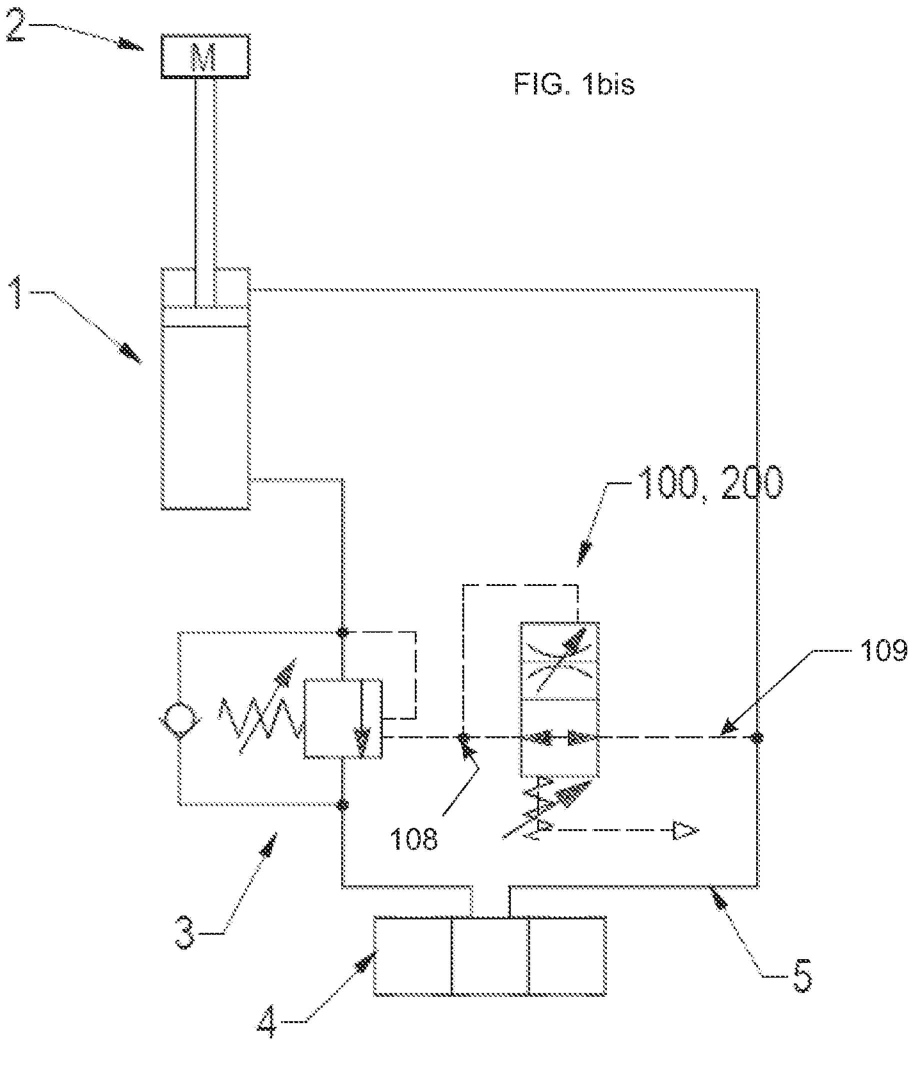
FIG. 1bis

DEVICE FOR CONTROLLING A PILOT PRESSURE SIGNAL

FIELD OF THE INVENTION

The present invention refers to the field of the devices for controlling the pilot pressure signal of hydraulic valves, particularly, but not exclusively, for controlling the handling of gravitational loads. The time-dependent control of the pilot pressure is necessary for avoiding instability events during the handling step of a dragged load by means of hydraulic actuators such as cylinders or motors.

STATE OF THE ART

Several systems for controlling the pilot pressure acting on a hydraulic valve, mainly comprising adjustable and non-adjustable throttling devices, dampening the pressure oscillations in the line supplying the return side of the cylinder and preventing the peaks from arriving in the pilot chamber of the descent control valve are known.

An example of the prior art is shown in the patent document EP1178219, wherein a hydraulic device for controlling a pilot pressure is described, wherein in this system there is an adjustable throttling device which decouples the pressure in the line supplying the hydraulic actuator or the cylinder during the load lowering step, from the pressure piloting the valve, by limiting the oscillations which affect the latter and stabilizing in this way the load descent.

In this embodiment, there is another two-way valve, which can take an open position and a closed position and that allows a quick filling of the pilot chamber of the overcenter valve until the exit side line pressure reaches a determined value, for avoiding a response delay which otherwise is typical of this system.

The disadvantage of this kind of approach is due to the fact that it must be necessarily formed by two parallel separate elements for implementing both the functions of dampening the signal and quickly filling the pilot chamber. Moreover, the embodiment described is not compact and does not allow a good flexibility in making hydraulic integrated circuits.

DISCLOSURE AND ADVANTAGES OF THE INVENTION

The object of the present invention consists of overcoming the above-mentioned disadvantages and all the disadvantages of the prior art, by implementing a device adapted to integrally perform the functions of dampening the pilot signal and of quickly filling the pilot chamber, with a compact arrangement which does not require additional elements inside the valve body.

The device of the present invention is a two-way and two-position valve for the communication between the cylinder stem-side pilot line and the valve-side pilot line. The valve can take an open position and a partialized position, or anyway it never takes a closed position; in other words, it can take a position that it never closes the fluid passage between the pilot lines. The main advantage of the present invention consists of making available a unique device embodying both the functions of dampening a pilot pressure signal and of quickly filling a pilot chamber, by eliminating the necessity of integrating in a valve body other elements for controlling said pressure signal.

Another advantage consists of positioning the present invention inside the manifold of an integrated hydraulic circuit having different arrangements of the hydraulic connections, by allowing a great flexibility in the construction arrangements of the valve unit, and allowing in this way to satisfy specific size constraints which can appear during the design of these devices.

Said object and advantages are all met by the pilot pressure signal control device, object of the present invention, which is characterized by the enclosed claims.

BRIEF DESCRIPTION OF THE DRAWINGS

This and other characteristics will be better understood from the following description of some embodiments shown by way of a non-limiting example in the attached drawings.

FIG. 1*bis* shows the hydraulic diagram of another example of an application of the first embodiment with a cone-shaped plug, which can be built in the variants A and B respectively shown in FIGS. 2 and 3.

DESCRIPTION OF THE INVENTION

Figure 1:
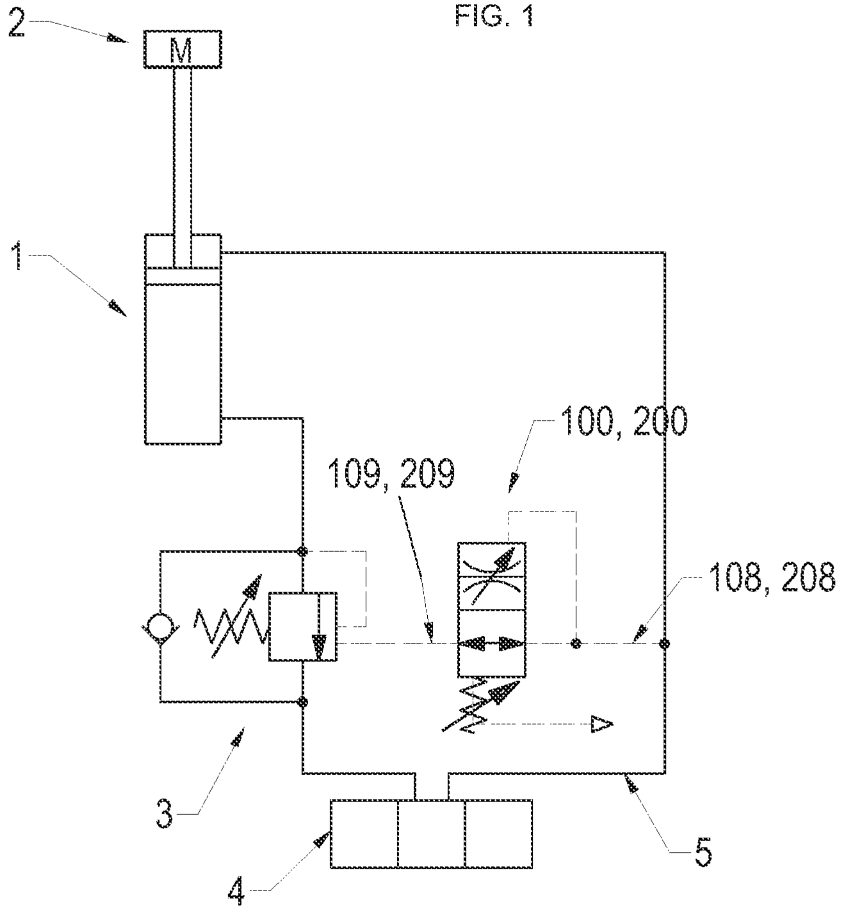
FIG. 1 shows an hydraulic diagram of an example of an application of the first embodiment with a cone-shaped plug, which can be built in the variants A and B respectively shown in FIGS. 2 and 3.

Referring particularly to FIGS. 1, 4, 6 and 8, they show four hydraulic diagrams for possible applications of the different embodiments of the pressure signal control device on a pilot line.

The pilot line is indicated by 108, 109 for a first embodiment; 208, 209 for a second embodiment and its variant; and 308, 309 for a third embodiment and its variant. The control device has been indicated by the reference number 100, 200, 200*bis*, 300 and 300*bis*.

A typical application of the present invention (100, 200, 200*bis*, 300, 300*bis*) consists of piloting an overcenter valve 3, which is located in an hydraulic line of a cylinder 1 for raising loads M.

In the diagram, a hydraulic distributor has been indicated by 4, while 5 indicates the cylinder stem-side supplying line (while on the other side operates the valve 3).

The control device, object of the invention, operates between the line 5 and the valve 3. Particularly, said control device is a valve integrating the functions of dampening the pilot signal and of quickly filling the pilot chamber, by means of a compact arrangement which does not require additional elements inside the valve body.

Said valve is characterized by the fact that it never completely shuts the communication between the pilot lines (108, 109, 208, 209, 308, 309): it is a two-way (for example line 108, 109) and two positions (with a port completely open or partialized) valve both for the communication between the cylinder stem-side pilot line and the valve-side pilot line, however, while a position allows a complete flow, the second position (despite the fact it does not completely close) performs a cross-section reduction.

First Example of an Embodiment

Variant A

Figure 2:
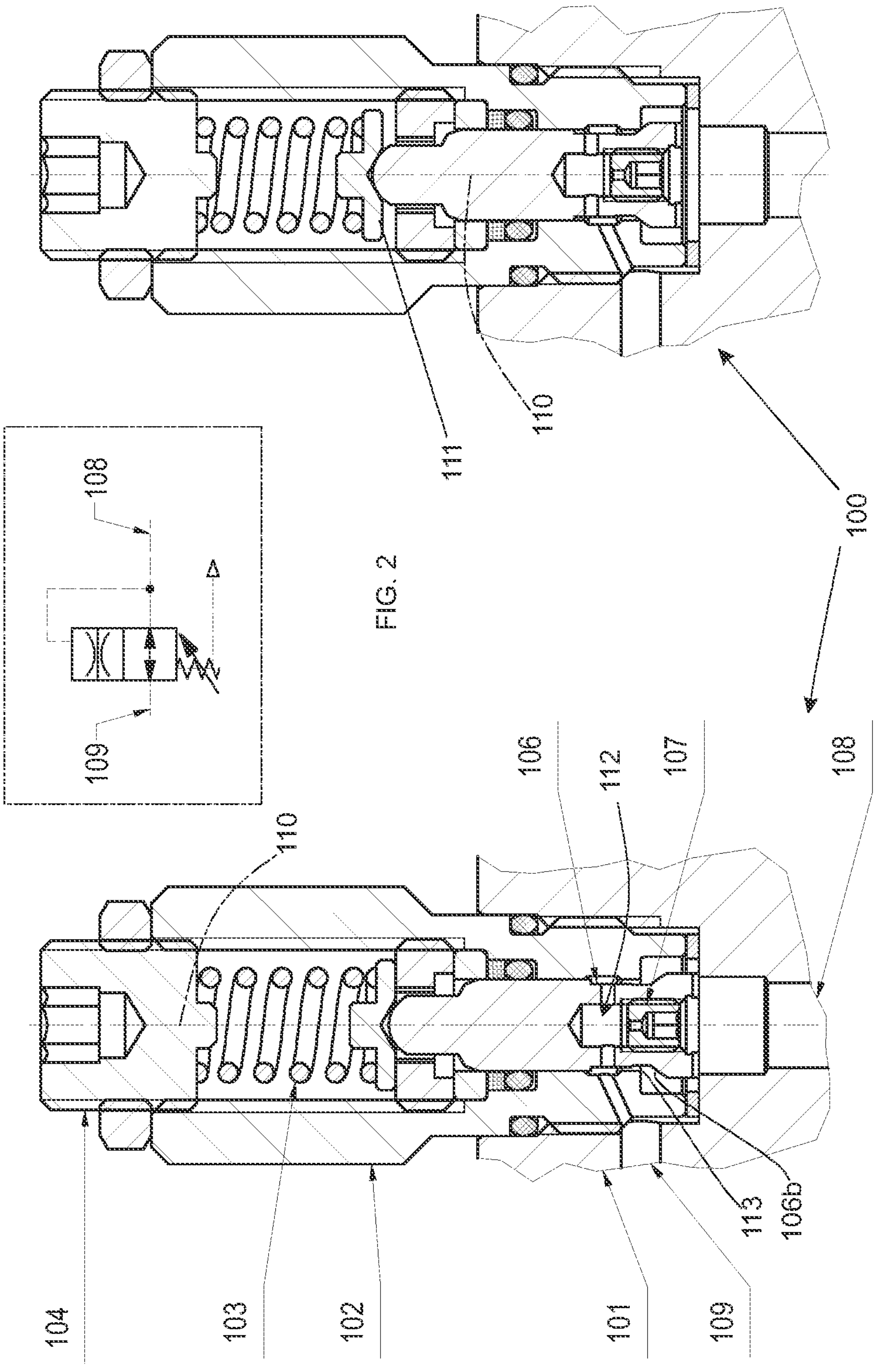
FIG. 2 shows the hydraulic diagram and the implementation of a variant indicated with A of a first embodiment having a cone-shaped plug of a pilot signal control device for hydraulic valves, for controlling the handling of gravitational loads.

Referring particularly to FIGS. 1 and 2, it is shown a device 100 for controlling the pilot pressure signal of hydraulic valves 3.

101 identifies the valve body wherein the device is integrated, 108 and 109 identify the hydraulic connections of the invention, respectively communicating with the cylinder and the valve-side pilot lines of valve 3.

A cartridge 102 is integral with the body 101 and comprises inside, along its axis 110, an elastic element 103 which drives a cone-shaped plug 106.

The compression force of the elastic element 103 is adjustable by a threaded stop 104 on which it abuts on the side opposed to the part contacting a washer 111 of the plug.

For explaining the cone-shaped plug, it is pointed out that it is formed by two rigidly connected parts: a first cylindrical part and a second part, which is the cone-shaped one, indicated by 106B.

The plug cylindrical part is shaped in order to allow a free fluid flow between the pressure lines 108 and 109, until the time in which said cone-shaped part 106B contacts the sealing corner 113 of the cartridge 102.

The plug 106 has another axial hole 112 for the passage to the line 109; said hole 112 is closed by a dowel 107 having an adjusted hole.

The plug is moved by the pressure present in the line 108 so that it can take two positions: an open position allows a free fluid flow from 108 to 109 and vice versa, while if the cone-shaped part 106B is pushed against the sealing corner 113 of the cartridge 102, the fluid flow is allowed through the drilled dowel 107 present in the plug 106 (in other words through the hole 112), in this way it implements the dampening effect.

The pressure causing the plug closure can be adjusted by acting on the stop 104 and therefore on the elastic element 103. The chamber receiving the elastic element 103 communicates with the outside environment and therefore it is usually at the atmospheric pressure, therefore the pressure causing the plug closure is not influenced by the variations of other pressures present inside the system.

Referring particularly to FIG. 1*bis*, it is also shown how the device 100 can operate with effects similar to the ones described by inverting the hydraulic connections, in other words with the hydraulic connection 108 communicating with the valve-side pilot line of valve 3, and the hydraulic connection 109 communicating with the line performing the supply of the hydraulic actuator during the load lowering step. This property holds true for all the examples of the embodiments and for the corresponding variants shown in the following, by keeping in mind that for the variants (200*bis*, 300*bis*), including a check valve 215, 315, the operation direction of said valve must be suitably modified for always assuring the release of the pilot pressure of the overcenter valve 3.

Another advantage of the present invention is the possibility of operating with two different arrangements of the hydraulic connections, allowing a substantial flexibility of the construction arrangements of the integrated hydraulic circuits in valve units of which the pilot control device is a part.

First Example of an Embodiment

Variant B

Figure 3:
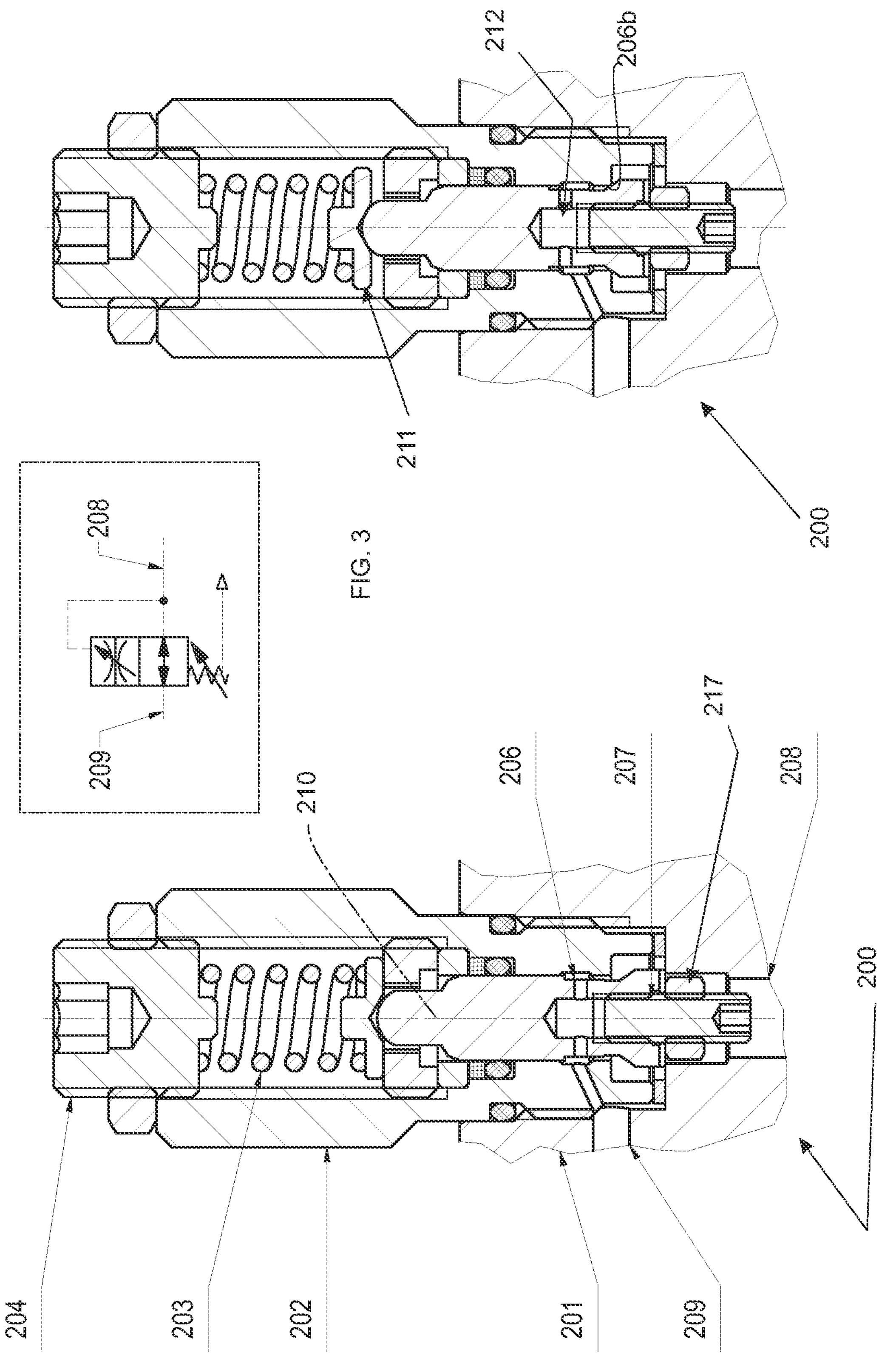
FIG. 3 shows the hydraulic diagram and the implementation of a variant indicated with B of the first embodiment with a cone-shaped plug.

Referring particularly to FIGS. 1 and 3, it is shown a device, now indicated by 200, for controlling the pilot line. The variant B has many elements and concepts of the approach of the variant A.

201 identifies the body of the device, 208 and 209 identify the hydraulic connections of the invention, respectively communicating with the stem-side pilot line of cylinder 1 and the valve-side pilot line of valve 3.

A cartridge 202 is integral with the body 201 and comprises inside, along its axis 210, an elastic element 203 which drives a cone-shaped plug 206.

The compression force of the elastic element 203 can be adjusted by a threaded stop 204 on which abuts from the part opposite to the one contacting the washer 211 of the plug.

For explaining the cone-shaped plug, it is pointed out that it is formed by two parts, of which a first part is cylindrical and a second part has a cone shape, indicated by 206B.

The plug cylindrical part is shaped in order to allow a free fluid flow between the pressure lines 108 and 109, to the instant in which said cone-shaped part 106B contacts the sealing corner 113 of the cartridge 102. Unlike the preceding example, the throttling device comprises a thread of a screw 207 forming a controlled spill changing as a function of the number of threads of the screw 207 which engage the threaded hole of the plug 206, in order to have an adjustable dampening device. A bolt 217 allows to keep the screw 207 stopped in position once has been made the adjustment.

The plug 206 has an axial passage hole 212 to the line 209; said hole 212 is closed by the screw 207 through which there is the spill.

The advantage of this embodiment consists of making possible to adjust the throttle of the pilot signal so that the system has the required quick response. Another advantage of this embodiment is that the user cannot directly access to the dampening level adjustment, this avoids the tampering of the in-house adjustment.

First Example of an Embodiment

Variant C

Figure 4:
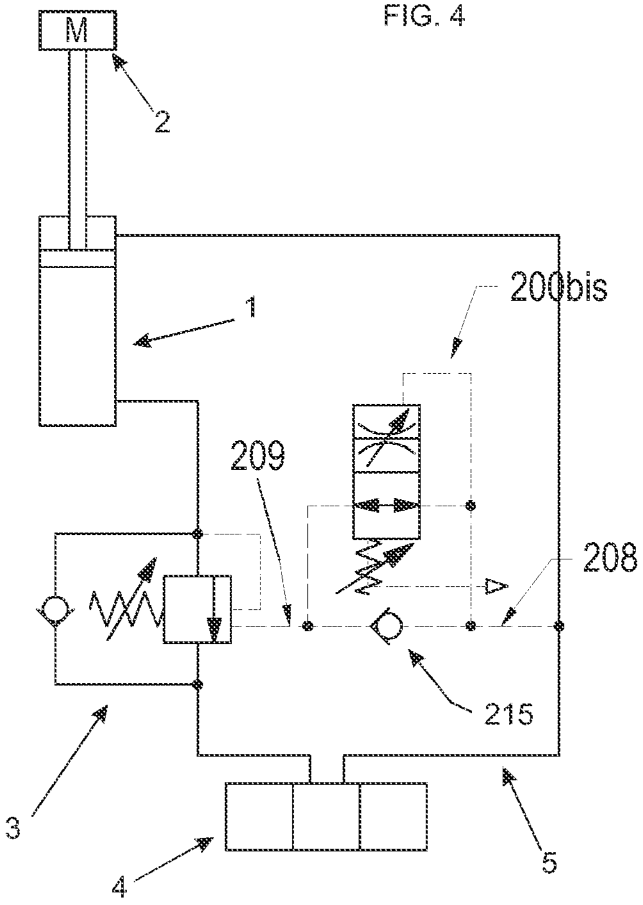
FIG. 4 shows the hydraulic diagram of the example of an application of the variant C of the first embodiment, shown in FIG. 5.
Figure 5:
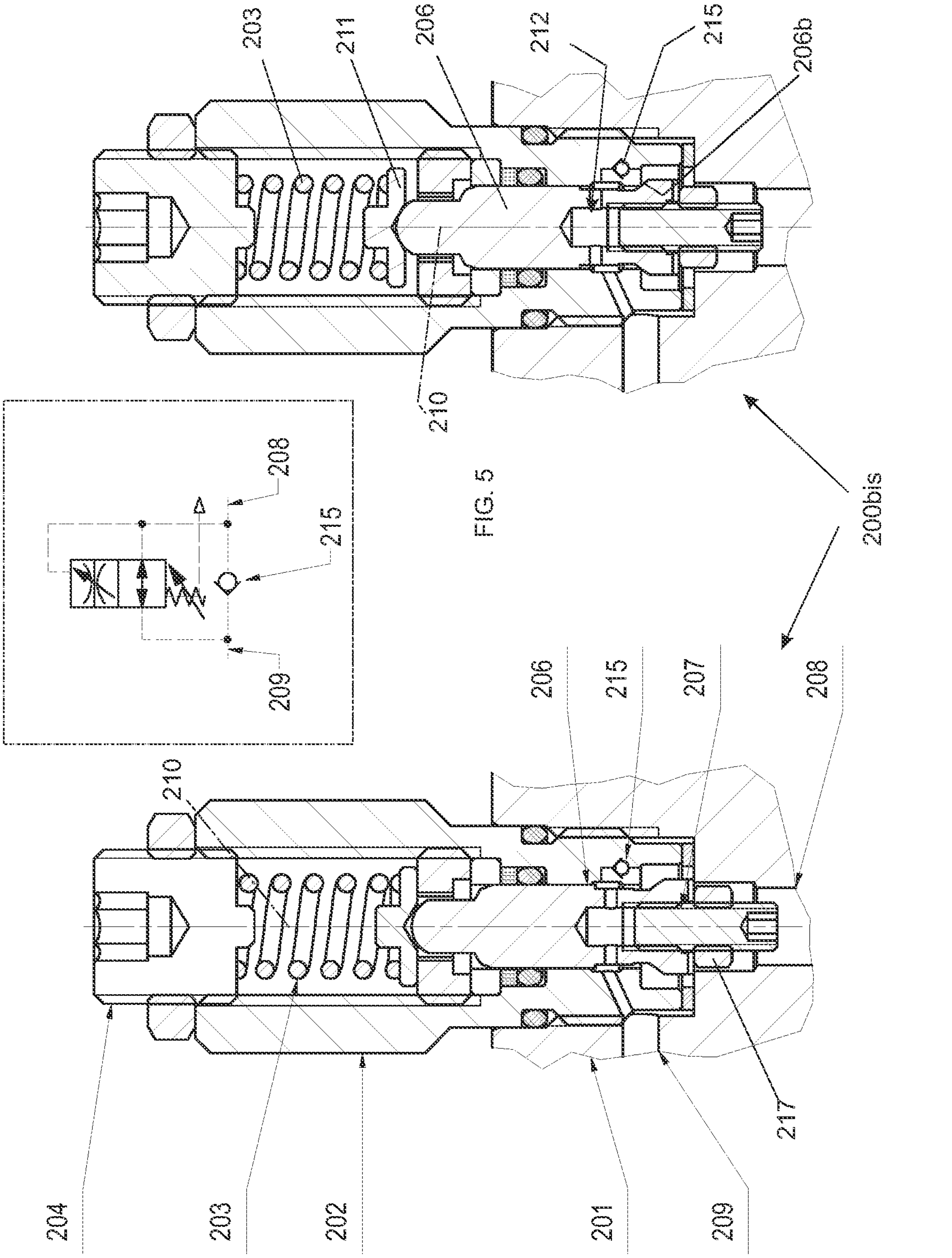
FIG. 5 shows the hydraulic diagram and the implementation of another variant, indicated with C, of the first example of an embodiment with a cone-shaped plug of the control device, comprising a one-way valve.

Referring particularly to FIGS. 4 and 5, they show a third variant of embodiment of the approach with a cone-shaped plug.

The device is now indicated by 200*bis*.

The approach is completely analogous to the variants A and B of the first example of an embodiment, in that it shows the same operation and similar advantages.

Unlike the above shown variants, it is observed the presence, integrated in the same device 200*bis*, of a check valve 215 allowing a quick release of the pressure in the line 209 when said pressure is greater than the one present in the line 208. This characteristic can be necessary in some applications for assuring an immediate closure of the balancing valve 3 in case of a brisk drop of pressure in the line 208, for example due to a failure or a quick release of the command by the operator.

Second Example of an Embodiment

Variant A

Figure 6:
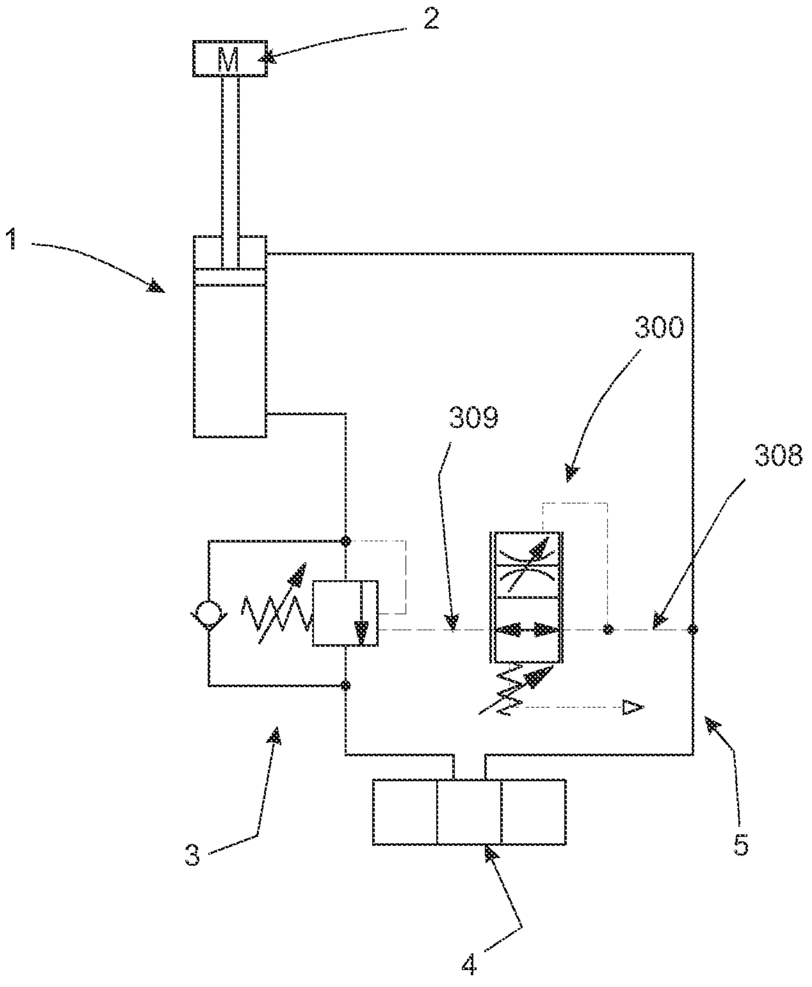
FIG. 6 shows the hydraulic diagram of an example of an application of the variant A of the second embodiment, shown in FIG. 7.
Figure 7:
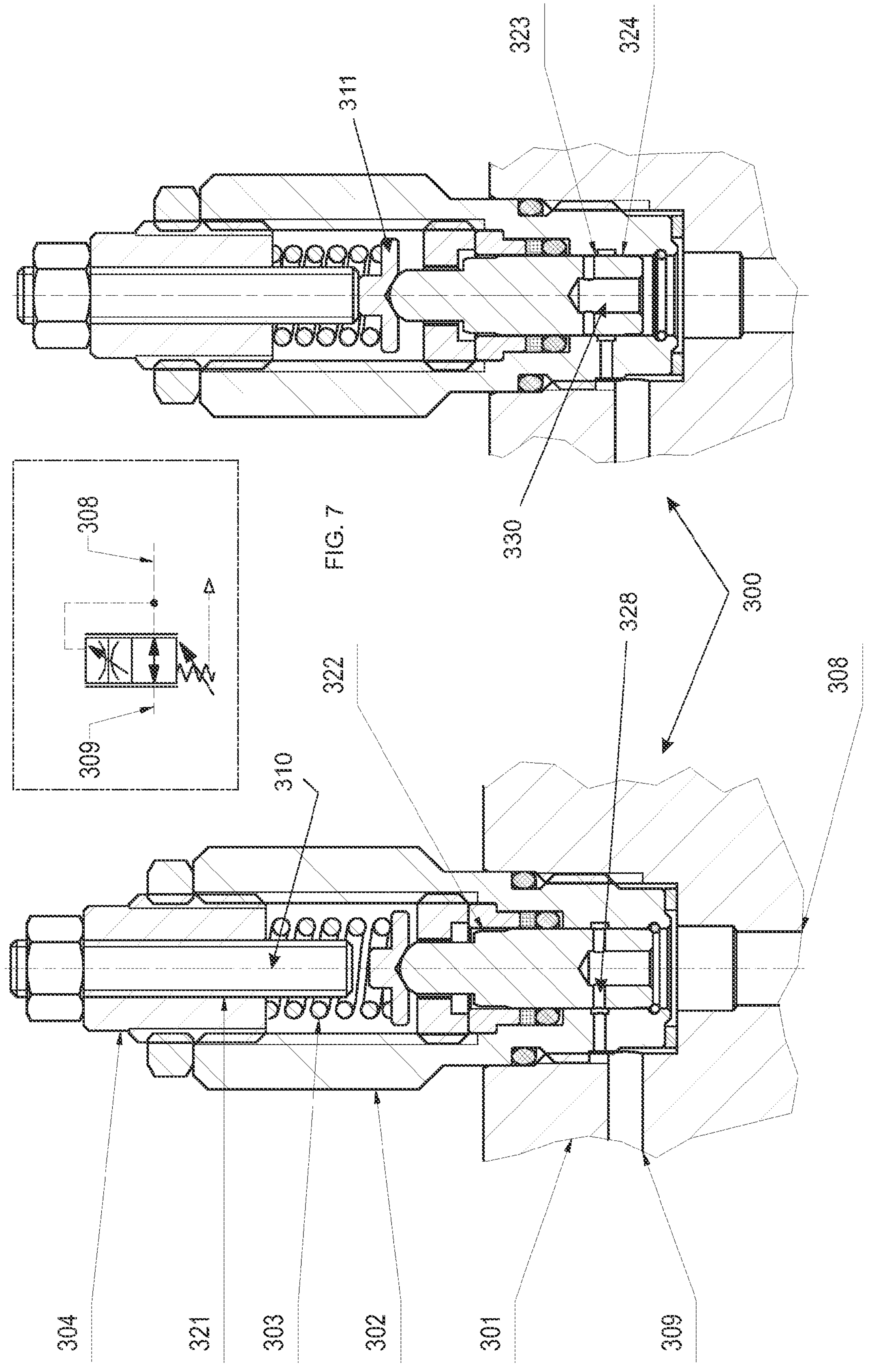
FIG. 7 shows the hydraulic diagram and the implementation of a variant indicated with A of a second embodiment having a slide plug of a pilot signal control device of hydraulic valves, for controlling the handling of gravitational loads.

Referring particularly to FIGS. 6 and 7, it is shown a second variant of the device to be inserted in the pilot line of valve 3.

Now the device for controlling the pilot pressure signal of the hydraulic valves 3 is indicated by 300.

Instead of the cone-shape plug, the device comprises a slider, identified by 322, slidable in the cartridge 302 hole and it is coupled with such hole on a single cylindrical surface.

301 identifies the device body, 308 and 309 identify the stem-side pilot lines of cylinder 1 and the valve-side pilot lines of valve 3, respectively.

Also in this case, the cartridge 302 is integral with the body 301 and comprises inside, along its axis 310, an elastic element 303 driving a slider 322 sliding in a corresponding axial hole. The compression force of the elastic element 303 is adjustable by a threaded stop 304 on which abuts from the side opposite to the contact side with a washer 311 of the plug. The chamber receiving the elastic element 303 communicates with the outer environment and therefore it is normally at an atmospheric pressure, therefore the movement of the slider is determined only by the pressure in the line 308 and is not affected by the variations of other pressures present inside the system.

Said slider 322 is precisely coupled with the cartridge and its positioning is continuous, in other words, it can take all the positions intermediate between the two positions shown in the diagram, according to the pressure value in the line 308, obtaining a different dampening effect according to the taken position, as it will be explained in the following.

In the open position, it is allowed the free fluid flow from 308 to 309 and vice versa through holes 330 and 328 of the plug 322.

When the length of the slider 322 having the cross hole 328 couples with the sliding diameter on the cartridge, the fluid passage between 308 and 309 is only allowed by the leakage through the space between the slider and the cartridge. The flow rate of the leakage passing from 308 to 309 or vice versa is determined by the coupling clearance between the slider 322 and the cartridge 302, which therefore can be suitably sized for determining the desired restriction level to the hydraulic fluid passage.

Said leakage occurs simultaneously on the high and low parts 323 and 324 of the slider 322. Due to the different shape of the two spaces in which the leakage occurs, the flow rates crossing the two coupling regions will be generally different, and will change in a different way as changes the position of the slider 322 inside the cartridge 302. Consequently, the whole leakage flow rate between the lines 308 and 309 and vice versa changes according to the position of the slider 322 with respect to the cartridge 302, allowing in this way a continuous modulation of the dampening effect.

The device is provided with a screw 321, a stop device, that allows to fix the maximum length of the coupling between the slider and the cartridge, for regulating the leakage which it is desired in the stop position.

An advantage of this solution is that, by the screw 321, the user has the availability, outside the valve unit, of a command for regulating the throttling maximum level which it is desired to apply to the pilot signal.

Another advantage is the graduality of the dampening effect: the slider can be suitably shaped with cavities and holes in order to obtain the desired correspondence law between the pilot pressures present in the line 308 and the leakage flow rate, for adapting the response of the hydraulic system to the requirements of the specific applications.

Second Example of an Embodiment

Variant B

Figure 8:
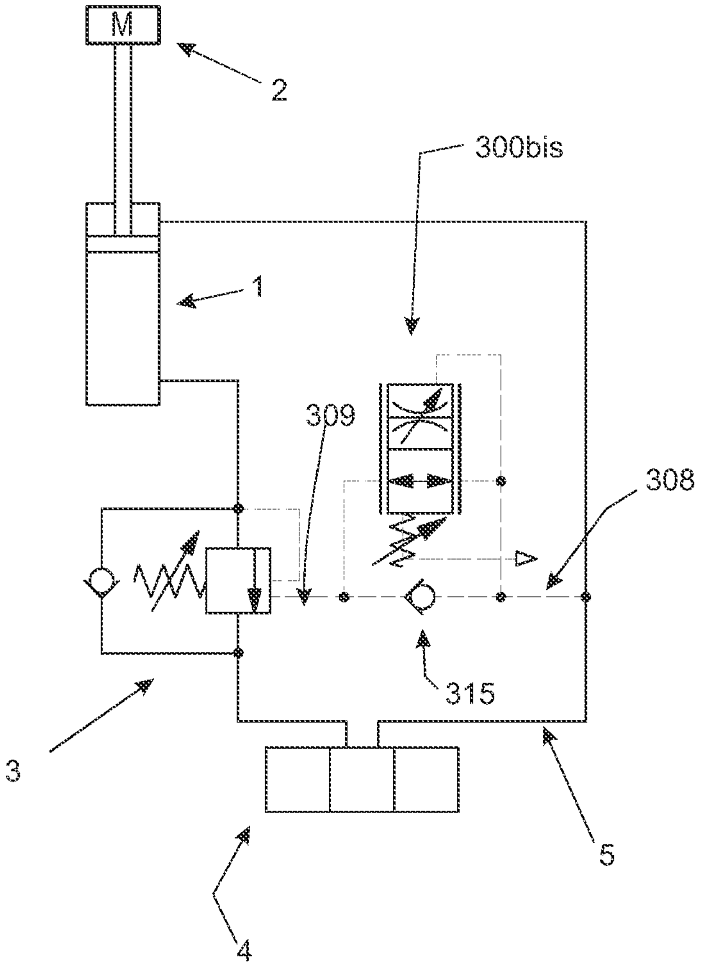
FIG. 8 shows the hydraulic diagram of an example of the variant B of the second embodiment with a slide plug shown in FIG. 9.
Figure 9:
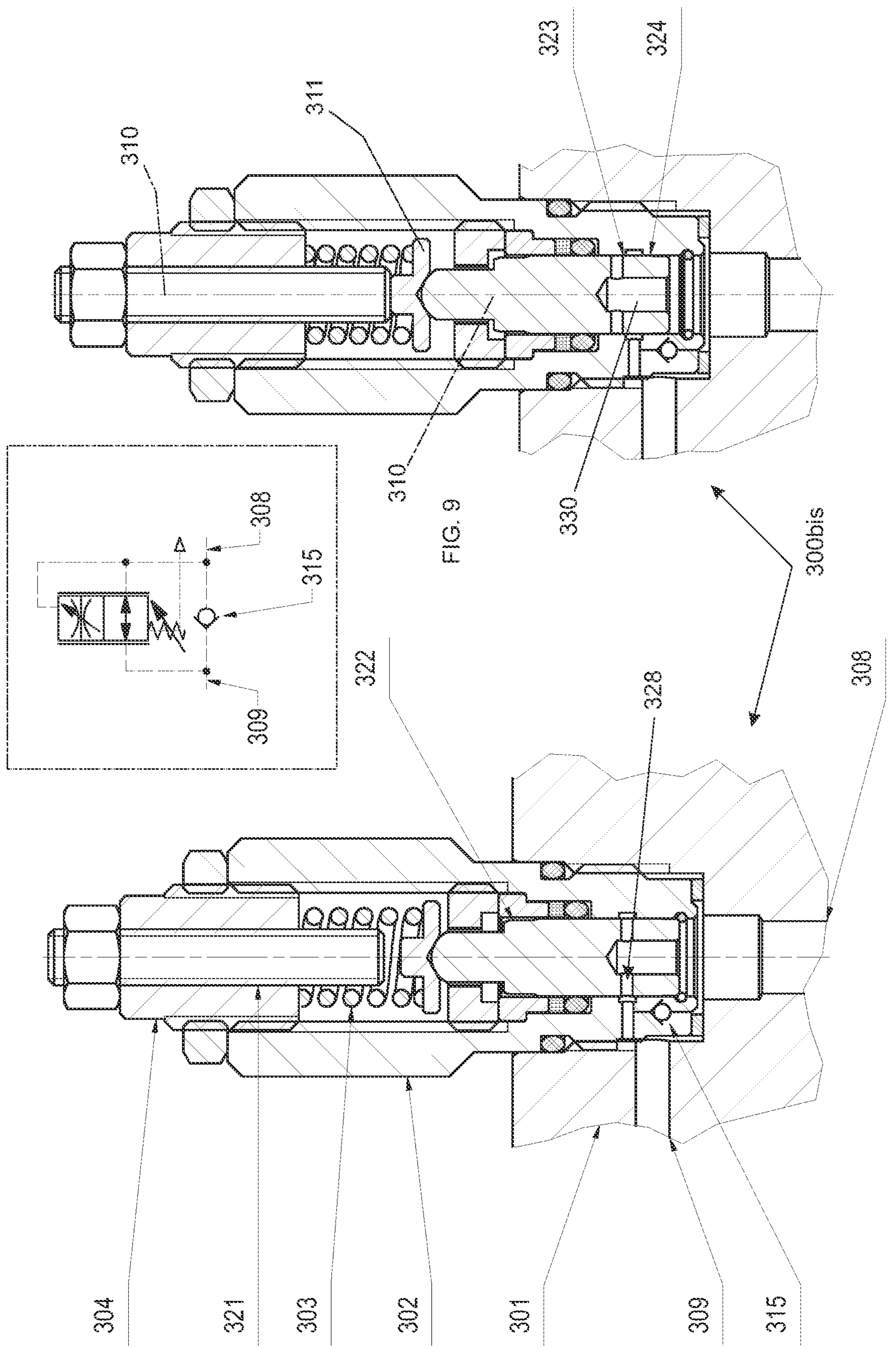
FIG. 9 shows the hydraulic diagram and the implementation of a variant indicated with B of the second example of an embodiment with a slide plug shown in FIG. 7, comprising a one-way valve.

Referring particularly to FIGS. 8 and 9, it is shown the variant B of the second example of the embodiment, with a slide approach and precisely in FIG. 8 the hydraulic diagram of an application example of a variant with a slider 322, and a check valve 315; FIG. 9 shows the embodiment and the hydraulic diagram of the variant shown in FIG. 8.

In FIG. 9, the device for controlling the pilot pressure signal of the hydraulic valves 3 is indicated by 300*bis*.

The approach is analogous to the variant A of the second example of the embodiment, of which it shows the same operation and similar advantages, moreover it comprises an integrated check valve 315 allowing a fast discharge of the pressure in the line 309 when said pressure is greater than the one present in the line 308. This characteristic can be necessary in some applications, for assuring an immediate closure of the balancing valve 3 in case of a brisk drop of pressure in the line 308, for example due to a failure or to a quick release of the command by the operator.

Other Variants

For obtaining different control systems, both the approaches, with a cone-shaped plug or a slider, can be made with a throttling also in an open position, for example, by an adjustable hole in the cartridge. In fact, if the cross hole draining from the cartridge is sufficiently small, will be also partialized the passage in the open position.

Moreover, the above arrangements of the device object of the present invention can be used with other pilot control hydraulic devices present in the prior art, in order to have a pilot signal suitably modulated according to the requirements of the plant in which it is used.

The invention claimed is:

1. A device for controlling a pilot pressure of hydraulic valves, operating between two pilot lines between said valve and the feeding line of a hydraulic actuator, comprising a two-way valve and two positions for the communication between the actuator-side pilot line and the valve side pilot line, characterized in that said two-way valve and two positions is capable of taking different positions such as to never completely close the passage of fluid between the pilot lines wherein said device comprises:

a cartridge having a respective hole and a transverse hole which is in fluid communication with the valve side pilot line;

a continuous positioning slider, with communication ducts comprising transverse and axial communication duct between the pilot lines, which precisely slides within the respective hole and is moved by the difference between the pressure in the actuator-side pilot line and the atmospheric pressure, which counteracts the force applied by an elastic element;

when the communication ducts allow the communication between said actuator-side pilot line and said valve-side pilot line, the fluid can flow freely from said actuator-side pilot line to said valve-side pilot line via the transverse hole and communication ducts, and vice versa; and when the transverse communication duct is not in fluid communication with the transverse hole of the cartridge, the passage of the fluid between said actuator-side pilot line and said valve-side pilot line is allowed only by leakage between the slider and the respective hole.

2. The device, according to claim 1, characterized in that the slider and the cartridge are made in suitable shapes such that the leakage flow-rate from the actuator-side pilot line to the valve-side pilot line and vice versa depends on the position of the slider relative to the cartridge.

3. The device, according to claim 1, characterized in that it comprises a mechanical stop member which allows adjusting the position that the slider takes in a condition of complete closure.

4. The device according to claim 1, characterized in that it additionally comprises a non-return valve for the quick relief of the pilot pressure from the valve-side pilot line to the actuator-side pilot line.

5. The device according to claim 1, characterized in that it comprises a throttling also in the opened position, through a calibrated hole on the cartridge.

* * * * *